(12) United States Patent
Cresswell

(10) Patent No.: US 6,517,121 B1
(45) Date of Patent: Feb. 11, 2003

(54) QUICK CONNECT/DISCONNECT COUPLING

(75) Inventor: William L. Cresswell, Chadwick, MO (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 09/704,865

(22) Filed: Nov. 1, 2000

(51) Int. Cl.[7] .............................................. F16L 37/00
(52) U.S. Cl. ......................... 285/321; 285/308; 285/39
(58) Field of Search ......................... 285/39, 321, 308, 285/81, 18, 24, 305, 309, 310, 312, 358, 394

(56) References Cited

U.S. PATENT DOCUMENTS

| | | | | |
|---|---|---|---|---|
| 3,948,548 A | * | 4/1976 | Voss ............................ | 285/321 |
| 5,378,024 A | * | 1/1995 | Kumagai et al. ............. | 285/39 |
| 5,553,895 A | | 9/1996 | Karl et al. ..................... | 285/39 |
| 5,853,204 A | * | 12/1998 | Bartholomew .............. | 285/305 |

FOREIGN PATENT DOCUMENTS

| | | | | |
|---|---|---|---|---|
| DE | 1115540 | * | 10/1961 | .................. 285/305 |
| FR | 2554543 | * | 5/1985 | .................. 285/321 |

* cited by examiner

Primary Examiner—Lynne H. Browne
Assistant Examiner—Michael P Ferguson
(74) Attorney, Agent, or Firm—Joseph J. Pophal

(57) ABSTRACT

A quick connect/disconnect coupling assembly includes (a) a female coupling member; (b) a male coupling member including an annular rib; (c) an expandable locking ring carried by the female coupling member, where the locking ring has an unexpanded inner diameter that is less than the maxinium diameter of the annular rib, and has an inner diameter slightly larger than the maximum diameter of the annular rib when expanded; (d) a rotatable dial carried on the male coupling member; and (e) a mechanical actuator including an axial lever coupled to the dial such that the axial lever extends radially outwardly upon rotation of the dial in a first direction to uncouple the male coupling member from the female coupling member, and retracts inwardly with respect to the male coupling member upon rotation of the dial in an opposite direction to couple the male coupling member to the female coupling member.

46 Claims, 6 Drawing Sheets

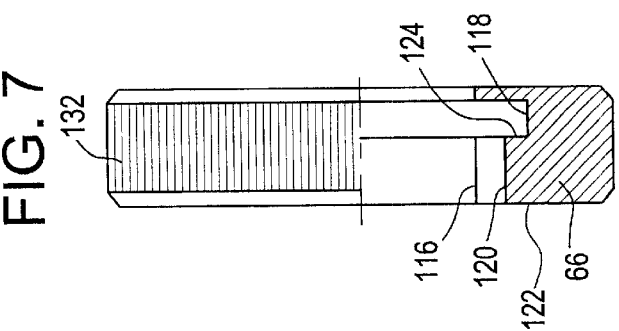
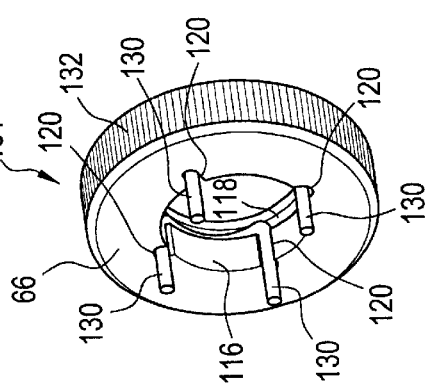
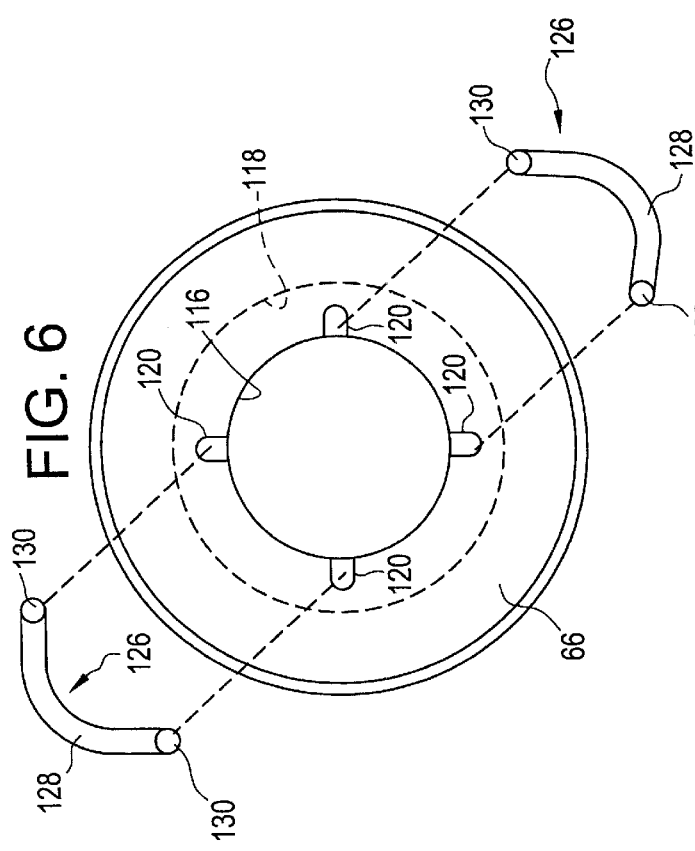
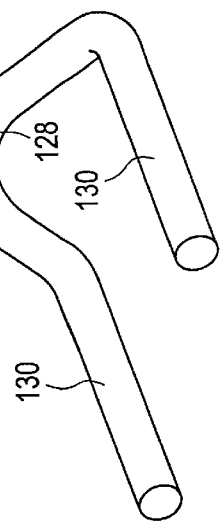

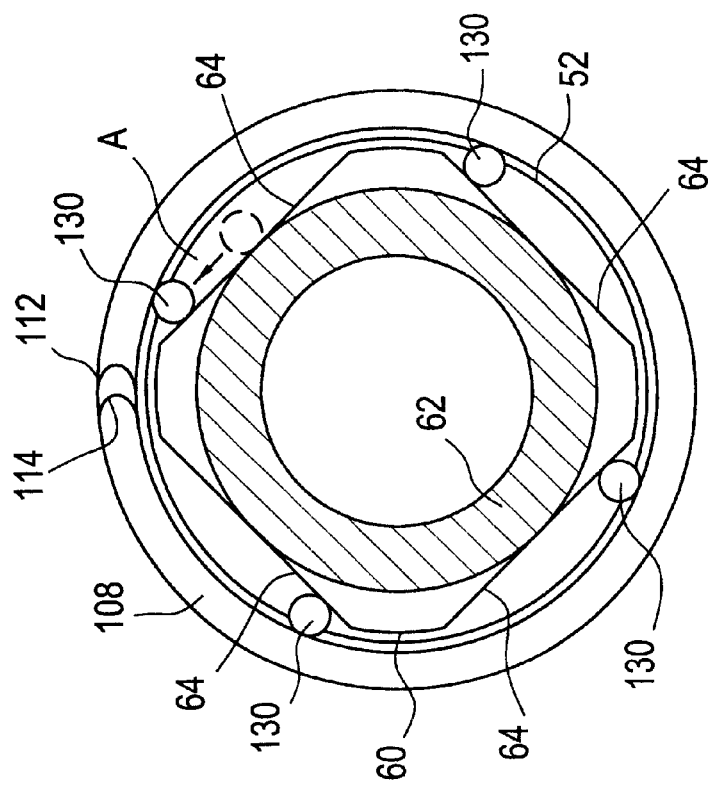
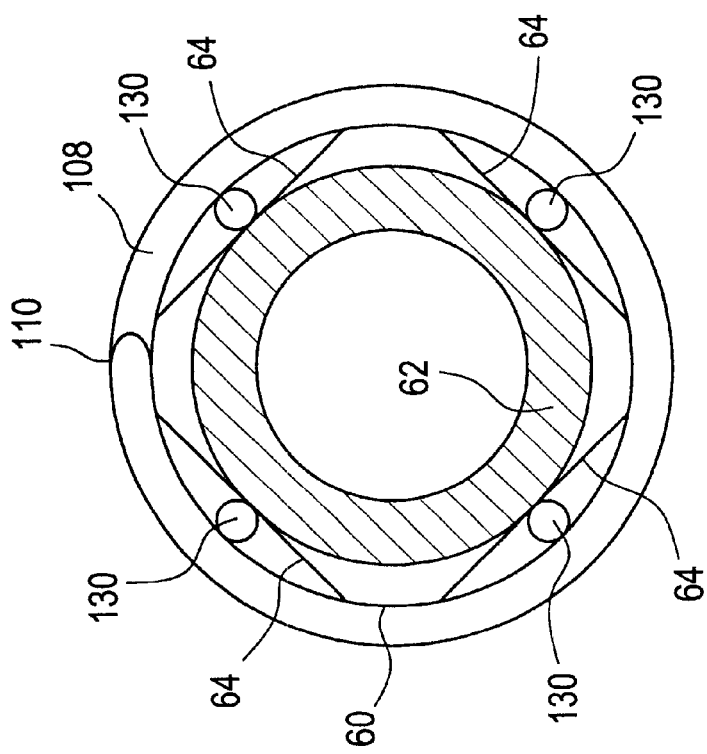

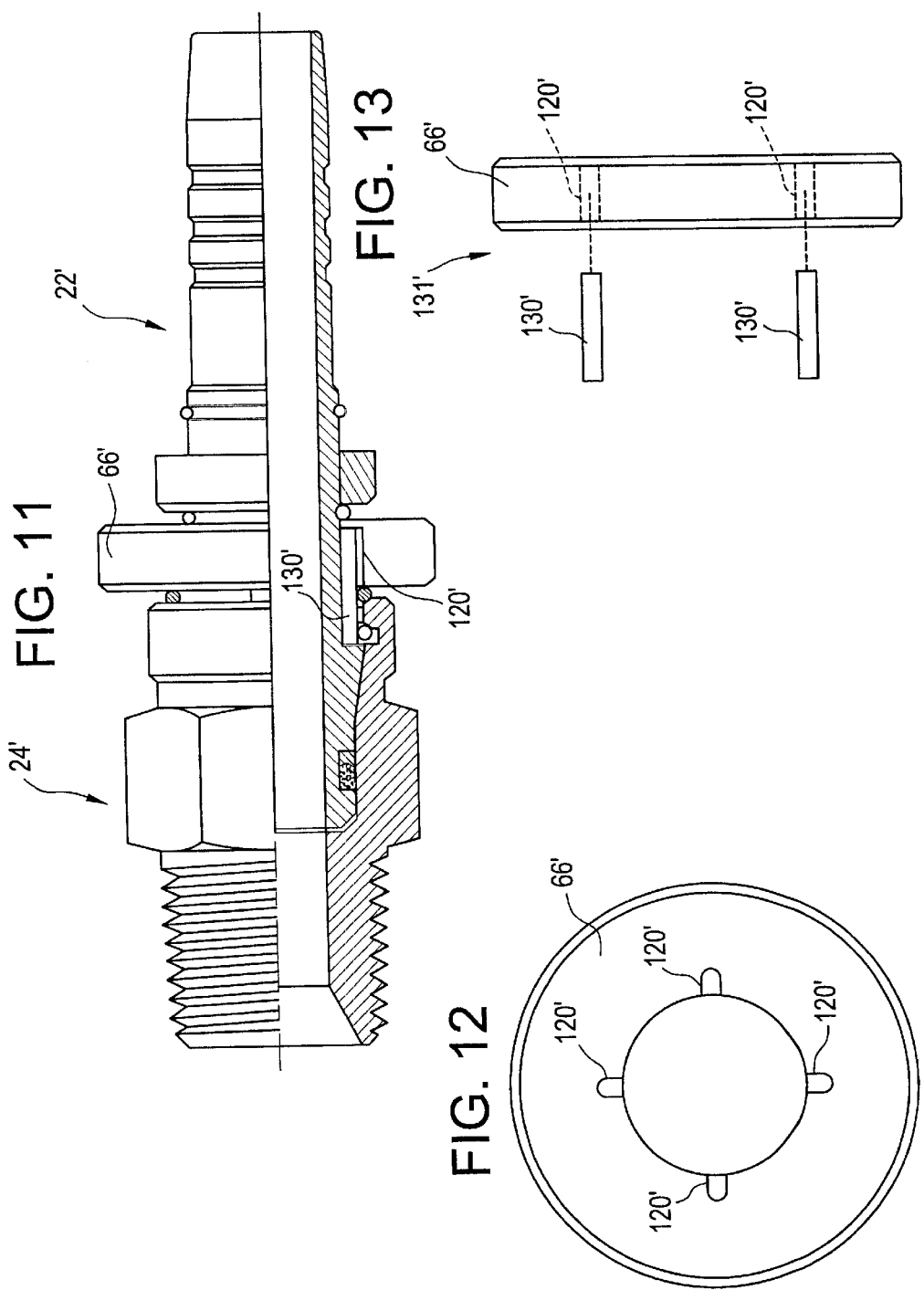

QUICK CONNECT/DISCONNECT COUPLING

BACKGROUND OF THE INVENTION

1. Field of the Invention

The present invention is directed to a quick connect/disconnect coupling, and more specifically, to a quick connect/disconnect hydraulic or pneumatic hose coupling that utilizes a diametrically expandable locking ring (such as a split ring) within a female coupling member to maintain a locking arrangement between the male and female coupling members, and a release mechanism that is designed to be actuated manually without the necessity of tools.

2. Prior Art Statement

It is known to provide a hydraulic or pneumatic hose coupling assembly that includes a male coupling member and a female coupling member, where the male and female coupling members extend along a central axis and where a leading end of the male coupling member is adapted to be inserted and locked within the female member. Each of the male and female members includes an axial passage extending therethrough for the passage of fluids.

The male member includes an annular rib having a ramped leading edge and a trailing edge. The female member includes an annular groove positioned within its receiving cylindrical cavity with a tapered receiving-side edge. Within this annular groove is carried a split ring of spring metal material. Upon insertion of the male coupling member into the cavity of the female coupling member, the ramped leading edge of the annular rib on the male coupling member contacts the inner surface of the split ring,.which causes the split ring to slide up upon the ramped leading edge and diametrically expand as the annular rib of the male coupling member advances through the split ring. Upon passing the trailing edge of the annular rib, the locking ring contracts again and is thus maintained in a locking position between the trailing edge of the annular rib and the receiving side edge of the annular groove in the female coupling member. To remove the male coupling member again from the female coupling member, a release sleeve, having an outer diameter larger than the maximum diameter of the annular rib, is axially slid between the male coupling member and the split ring to thereby diametrically expand the split ring again so that the rib of the male coupling member may pass again by this expanded split ring.

A disadvantage with this prior art coupling assembly is that the axial sliding of the release sleeve for disengaging the split ring requires the use of a tool to assist in gripping the sleeve and pulling it or pushing it axially along the male coupling member.

Accordingly, there is a need for such a coupling assembly that includes a release mechanism that may be manually actuated by hand, without the assistance of tools.

SUMMARY OF THE INVENTION

One aspect of the present invention provides a coupling assembly that includes; (a) a female coupling member including a cavity opening onto the receiving end, where the cavity has an annular groove; (b) a male coupling member including an annular rib, where the rib has a tapered leading edge, a trailing edge and a maximum diameter between the leading and trailing edges, and where the male coupling member is sized for insertion into the cavity of the female coupling member so that the trailing edge of the annular rib is able to pass the receiving-side edge of the annular groove in the female coupling member, (c) a diametrically expandable locking ring carried in the annular groove of the female coupling member, where the locking ring has an unexpanded inner diameter that is less than the maximum diameter of the annular rib on the male coupling member, and where the locking ring is diametrically expandable to have an inner diameter that is at least slightly larger than the maximum diameter of the annular rib on the male coupling member; (d) at least one mechanical actuator carried on the male coupling member, positioned on a trailing edge side of the annular rib, adjacent to the trailing edge of the annular rib, and operable to project radially outwardly to a radial height at least equal to a radial height of the annular rib at the maximum diameter of the annular rib.

Therefore, upon insertion of the male coupling member into the cavity of the female coupling member, the tapered leading edge of the annular rib on the male coupling member contacts an inner surface of the locking ring and causes the locking ring to diametrically expand as the annular rib passes through the locking ring. Upon passing the trailing edge of the annular rib, the locking ring contracts again and is maintained in a locking position between the trailing edge of the annular rib and a receiving side edge of the annular groove. To remove the male coupling member from the female coupling member, the mechanical actuator is activated so that the actuator projects radially outwardly and contacts the inner surface of the locking ring to cause the locking ring to diametrically expand again so that the annular rib of the male coupling member may be passed back again by the locking ring.

Preferably, the mechanical actuator includes at least one, and preferably a plurality, of mechanical levers operable to splay radially outwardly. Such levers may include a carrier mounted for rotation on the male coupling member on a trailing edge side of the annular rib and axially spaced from the annular rib, an outer cam surface on the male coupling member positioned axially between the trailing edge of the annular rib and the carrier, and extending in a circumferential direction from a first diameter that is substantially radially recessed with respect to the annular rib to a second diameter that approximates the maximum diameter of the annular rib, and a pin extending axially from a radial point on the carrier approximate the first diameter and extending over at least a portion of the outer cam surface. Therefore, upon rotation of the carrier the pin is caused to slide in a circumferential direction along the outer cam surface such that the outer cam surface acts as a fulcrum to splay the pin radially outwardly as the pin approaches the end diameter of the cam surface. The outer cam surface may be a substantially flat surface on a plane parallel to a tangent of the rotational axis of the carrier or may be a curved surface. It is preferred that the carrier is a manually rotatable dial and includes a textured circumferential surface to improve gripping by a user so that the male and female coupling members may be decoupled by a user without the assistance of tools.

The mechanical actuator may also be characterized as including: (a) a carrier mounted for I rotation on the male coupling member on a trailing edge side of the annular rib and axially spaced from the annular rib; (b) a cylindrical segment of the male coupling member positioned axially between the trailing edge of the annular rib and the carrier, where the cylindrical segment has an outer diameter approximate the maximum diameter of the annular rib, the cylindrical segment of the male coupling member includes a plurality of substantially flat, outer cam surfaces cut or formed therein and uniformly distributed about a circumference of the cylindrical segment, and where each of the outer cam surfaces extends generally tangentially from a minimum diameter that is substantially radially recessed with respect to the annular rib to the outer diameter of the cylindrical segment; and (c) a plurality of pins corresponding to the plurality of outer cam surfaces, where each pin extends axially from a respective radial point on the carrier, approximate the minimum diameter, and extending over at least a portion of the respective outer cam surface, where the pin is either radially pivotable or flexible with respect to the radial point on the carrier. Therefore, upon rotation of the carrier, the pins are caused to slide in a circumferential direction along their respective outer cam surfaces such that they splay radially outwardly as they approach the outer diameter of the cylindrical segment. Such radially outward splaying of the pins, in turn, applies pressure to the inner surface of the locking ring to cause the locking ring to diametrically expand.

It is another aspect of the present invention to provide a coupling assembly that includes: (a) a female coupling member including a cavity opening onto its receiving end, where the cavity has an annular groove; (b) a male, coupling member including an annular rib, where the rib has a tapered leading edge, a trailing edge and a maximum diameter between the leading and trailing edges, and where the male coupling member is sized for insertion into the cavity of the female coupling member so that the trailing edge of the annular rib is able to pass the receiving-side edge of the annular groove in the female coupling member; (c) a diametrically expandable locking ring carried in the annular groove of the female coupling member, where the locking ring has an unexpanded inner diameter that is less than the maximum diameter of the annular rib on the male coupling member, and where the locking ring is diametrically expandable to have an inner diameter that is slightly larger than the maximum diameter of the annular rib on the male coupling member; (d) a dial carried for rotation in the male coupling member; and (e) a mechanical actuator carried on the male coupling member operatively coupled to the dial such that the mechanical actuator extends radially outwardly with respect to the male coupling member upon rotation of the dial in a first direction, to a radial height at least approximately equal to a radial height of the annular rib at a maximum diameter of the annular rib, and retracts inwardly with respect to the male coupling member upon rotation of the dial in an opposite direction. Accordingly, upon insertion of the male coupling member into the cavity of the female coupling member, the tapered leading edge of the annular rib on the male coupling member contacts an inner surface of the locking ring, which causes the locking ring to diametrically expand as the annular rib passes through the locking ring. Upon passing the trailing edge of the annular rib, the locking ring contracts again and is maintained in a locking position between the trailing edge of the annular rib and the receiving side edge of the annular groove. The male coupling member may be removed again from the female coupling member by rotating the dial in the first direction so that the mechanical actuator projects radially outwardly and contacts the inner surface of the locking ring, causing the locking ring to diametrically expand again so that the annular rib of the male coupling member may pass again by the locking ring.

Preferably the dial is manually rotatable. It is also preferred that the mechanical actuator includes a pin that is operable, upon rotation of the dial in a first direction, to splay radially outwardly. With such a pin, it is preferred that the mechanical actuator includes a cam surface axially positioned between the annular rib and the dial, where the cam surface extends in a circumferential direction from a first diameter that is substantially radially recessed with respect to the annular rib to a second diameter that approximates the maximum diameter of the annular rib. For the purposes of this disclosure, the second diameter will "approximate" the maximum diameter when the radial distance between the two is equal to the diameter (or radial width if not cylindrical) of the pin. The dial rotates about a central axis of the male coupling member and the pin extends axially from a radial point on the dial approximate the first diameter, and extends over at least a portion of the cam surface. Therefore, upon rotation of the carrier, the pin is caused to slide in a circumferential direction along the cam surface from the first diameter towards the second diameter, which in turn causes the pin to splay radially outwardly as the pin i approaches the second diameter.

Accordingly, it is an object of the present invention to provide a coupling assembly that includes a release mechanism that may be manually actuated by hand, without the assistance of tools. It is a further object of the present invention to provide a coupling assembly in which the male and female coupling members are securely retained together under relatively high working pressures. It is a further object of the present invention to provide a coupling assembly that significantly reduces in-field maintenance tooling and simplifies component replacement. It is to be understood, however, that it is not necessary to meet any or all of the stated advantages or objects of the present invention disclosed herein in order to fall within the scope of any claims, since the invention is defined by the claims and since inherent and/or unforeseen advantages of the present invention may exist even though they may not be explicitly discussed herein.

BRIEF DESCRIPTION OF THE DRAWINGS

FIG. 1A is a magnified view of the section of FIG. 1 identified as 1A;

FIG. 6 is an exploded end view of the twist-ring sub-assembly of the first exemplary embodiment of the quick connect/disconnect mechanism of the present invention;

FIG. 7 is an elevational and partially cross-sectional view of the dial (or twist-ring) of the twist-ring sub-assembly of FIG. 6;

FIG. 8 is a perspective view of the lever-type actuator component of the twist-ring sub-assembly of FIG. 6;

FIG. 9 is a perspective view of the twist-ring sub-assembly of FIG. 6;

FIG. 10A is a cross-sectional end view of the twist-ring sub-assembly and locking ring of woo the first exemplary embodiment of the quick connect/disconnect mechanism of the present invention, illustrating a coupled configuration;

FIG. 10B is a cross-sectional end view of the twist-ring sub-assembly and locking ring of the first exemplary embodiment of the quick connect/disconnect mechanism of the present invention, illustrating a decoupling step of the present invention;

FIG. 11 is an elevational and partially cross-sectional view of the second exemplary embodiment of the quick connect/disconnect mechanism of the present invention, illustrating the male and female coupling members in a coupled configuration;

FIG. 12 is an elevational end view of the dial component of the embodiment illustrated in FIG. 11; and FIG. 13 is an exploded elevational side view of the twist-ring sub-assembly of the embodiment illustrated in FIG. 11.

DETAILED DESCRIPTION OF PREFERRED EMBODIMENTS

Figure 1:
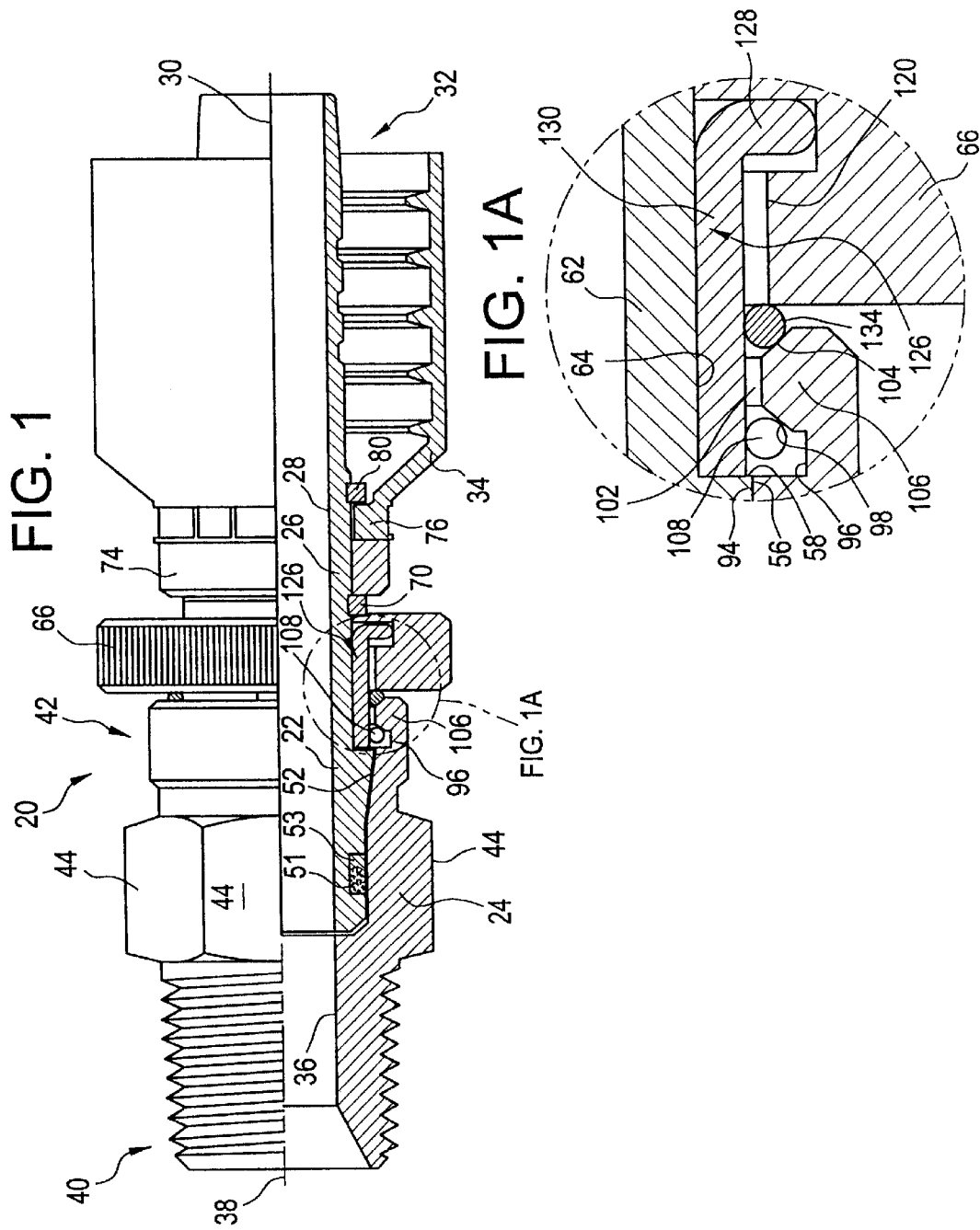
FIG. 1 is an elevational and partially cross-sectional view of the first exemplary embodiment of the quick connect/disconnect mechanism of the present invention, illustrating the male and female coupling members in a coupled configuration.

As shown in FIGS. 1–10, an exemplary embodiment of a quick connect/disconnect mechanism according to the present invention is a hydraulic hose fitting assembly 20 designed and dimensioned to meet the SAE J517-Series 100R12 pressure standard. Referring to FIGS. 1–5, the assembly 20 includes a male coupling member 22 adapted for fitting a hydraulic hose (not shown) thereon and a female coupling member 24 adapted to be attached to a hydraulic fluid source, receptacle or passage. The male coupling member 22 includes a generally cylindrical body 26 having a cylindrical conduit or passage 28 extending completely therethrough along a central axis 30 of the male coupling member 22. Mounted to the trailing end 32 of the generally cylindrical body 26 is a ferrule 34 of conventional design which is adapted to attach a hydraulic hose (not shown) to the trailing end 32 of the cylindrical body 26.

The female coupling member 24 also includes a conduit 36 extending completely therethrough along a central axis 38 thereof for providing passage of the hydraulic fluid therethrough. The distal end 40 of the female coupling member is threaded for mounting the female coupling member 24 to a hydraulic fluid source, receptacle or passage as known to those of ordinary skill in the art. Between the receiving end 42 and the distal end 40 of the female coupling member is provided a plurality of circumferentially distributed flats 44 that define a hexagonal cross section for engagement by an appropriate tool, such as a wrench, to install the female coupling member 24 to the appropriate hydraulic fluid receptacle, source or passage.

As shown in FIGS. 1–4, the generally cylindrical body 26 of the male coupling member 22 includes a tapered leading edge 46 immediately trailed by a cylindrical surface 48 that includes a circumferential groove 50 provided therein for receiving appropriate seals, such as an O-ring 51 and backup washer 53. The cylindrical surface 48 is trailed by an annular rib 52 that includes a ramped leading edge 54, immediately trailed by a substantially cylindrical surface 56 at its maximum diameter and a trailing edge shoulder 58 that is substantially perpendicular to the flat surface 56. The ramped leading edge 54, in this exemplary embodiment, is angled with respect to the axis 30 at a 10° angle. It will be apparent that alternate angles are possible for this ramped leading edge 54, however, it is preferred, but not required, that the ramped leading edge 54 be angled with respect to the axis 30 at an angle ranging from 8° to 20°. Trailing the annular rib 52 is a cam segment 60 and a cylindrical bearing segment 62. The cam segment 60 is a cylindrical segment having a plurality of flats 64 cut or formed therein, where each flat 64 is substantially tangential to the cylindrical bearing segment 62. As will be discussed in further detail below, each of the flats 64 acts as a cam surface or a fulcrum for the release actuator of the quick connect/disconnect mechanism 20.

The cylindrical bearing segment 62 journals a substantially disk-shaped twist ring, or dial 66 for rotation thereon. This dial 66 will act as a carrier for the release actuator of the quick connect/disconnect mechanism 20 as will be discussed in detail below.

The cylindrical bearing segment 62 is immediately trailed by a circumferential groove 68 for receiving a snap ring 70. The annular groove 68 is immediately trailed by a cylindrical surface 72 for mounting the lock-on ring 74 and attachment collar 76 of the ferrule 34, respectively. This cylindrically flat surface 72 is immediately trailed by another annular groove 78 for receiving a snap ring 80.

Referring to FIGS. 1, 1A, 2 and 5, the female coupling member 24 includes a receiving cavity 82 extending into the receiving end 42 and coaxial with the center axis 38. This cavity 82 is sized and dimensioned for receiving and securing the leading end of the male coupling member therein. Accordingly, the cavity 82 includes an end shoulder 84 for abutment against the leading end surface 86 of the male coupling member. An outwardly angled conical surface 88 extends from the end shoulder 84 to match the tapered leading edge 46 of the coupling member. A substantially flat cylindrical surface 90 extends from the conical surface 88 to receive the cylindrical surface 48 of the male coupling member, where the O-ring seal 51 is adapted to provide a substantially fluid tight seal between the leading end of the male coupling member and the inner surface of the cavity 82 in the female coupling member. From there, an outwardly angled conical surface 92 extends therefrom to match the ramped leading edge 54 (10° angle) of the annular rib 52 on the male coupling member. This conical surface 92 thereafter extends to a cylindrical surface 94 adapted to match the circumferentially flat outer surface 56 at the maximum diameter of the annular rib 52 of the male coupling member. The remainder of the cavity 82 extending from the cylindrical surface 94 to the receiving end 42 of the female coupling member 24 is particularly adapted to provide the locking engagement with the male coupling member.

The locking elements provided in the receiving cavity 82 of the female coupling member 24 essentially include an annular groove 96 having a tapered receiving-side edge 98, having a taper at an angle of 450 with respect to the axis 38 in this exemplary embodiment. The distal-side side edge 100 of the annular groove 96, in this embodiment, is not tapered, but provides a substantially perpendicular angle. The tapered receiving side edge 98 of the annular groove 96 extends to a substantially flat cylindrical surface 102, which in turn, extends to a substantially outwardly angled conical surface 104, which is angled 45° with respect to the axis 38 in this exemplary embodiment. The combination of surfaces 96, 98 and 102 discussed above essentially provide an inwardly extending flange 106 approximate the receiving end 42 of the female coupling member 24.

Figure 2:
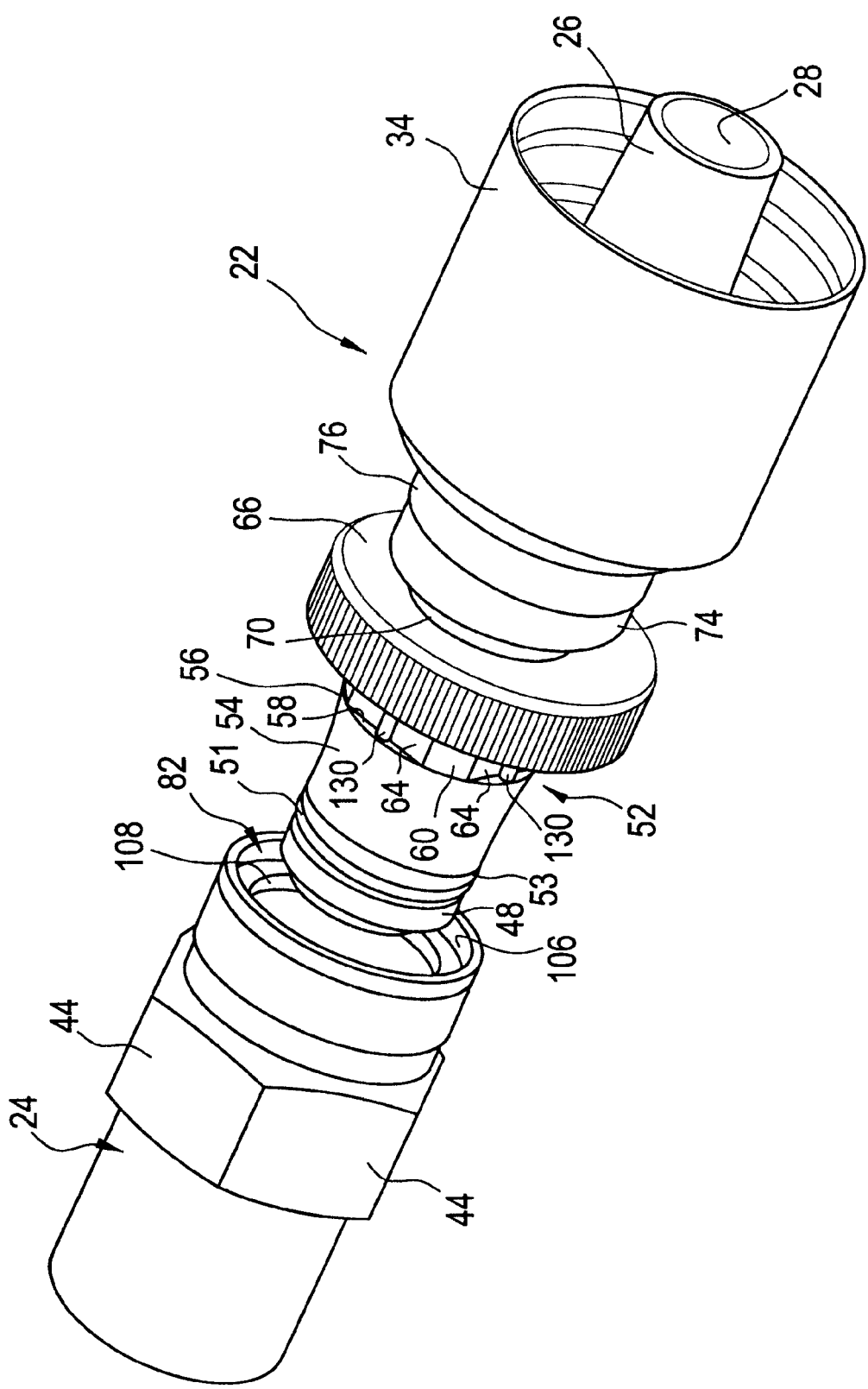
FIG. 2 is a perspective view of the first exemplary embodiment of the quick connect/disconnect mechanism of the present invention, illustrating the male and female coupling members in a decoupled configuration.
Figure 3:
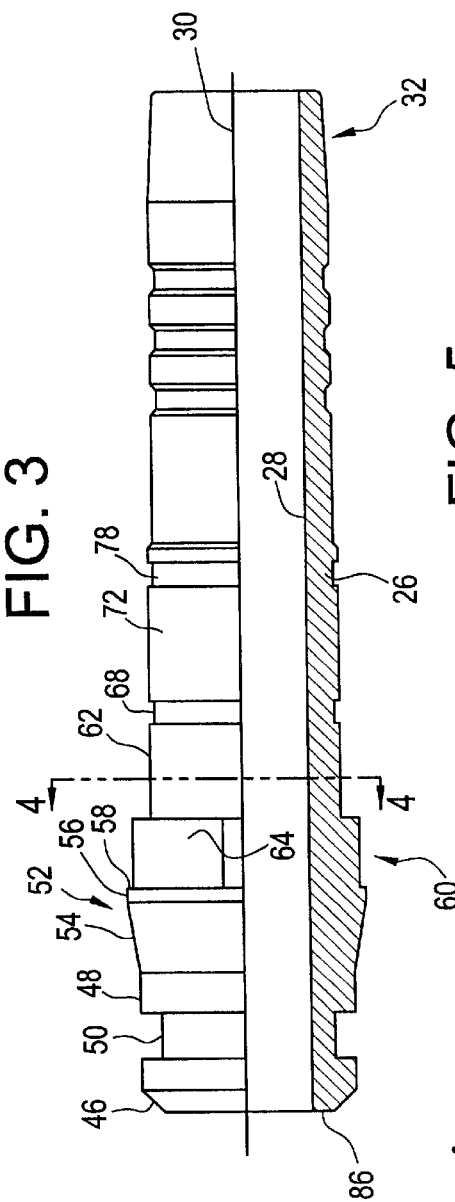
FIG. 3 is an elevational and partially cross-sectional view of the generally cylindrical body of the male coupling member of the first exemplary embodiment of the quick connect/disconnect mechanism of the present invention.
Figure 4:
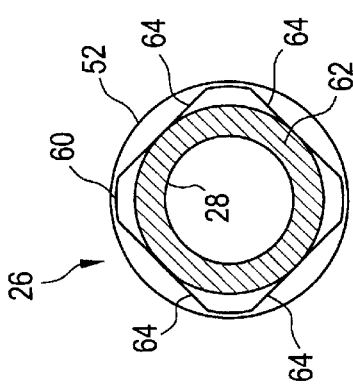
FIG. 4 is a cross-sectional view of the generally cylindrical body of the male coupling member taken along lines 4—4 of FIG. 3.
Figure 5:
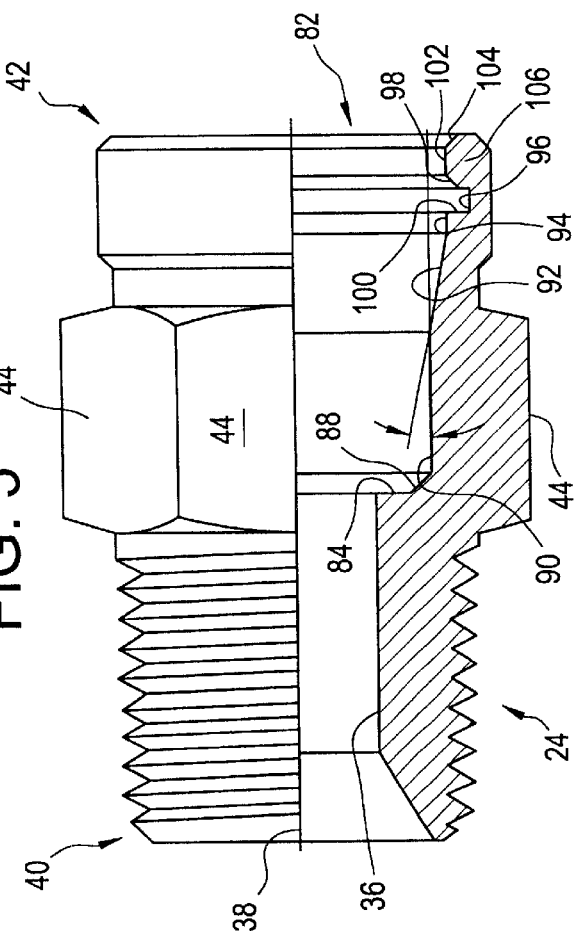
FIG. 5 is an elevational and partially cross-sectional view of the female coupling member of the first exemplary embodiment of the quick connect/disconnect mechanism of the present ire invention.

Referring to FIGS. 1, 1A and 2 the female coupling member 24 also includes a diametrically expandable ring 108 that is carried within the annular groove 96 in the receiving cavity 82. The ring 108 is expandable from an unexpanded inner diameter that is less than the maximum diameter 56 of the annular rib 52 on the male coupling member to an expanded inner diameter that is at least slightly larger than the maximum diameter 56 of the annular rib 52 on the male coupling member. Referring to FIGS. 10A and 10B, in the exemplary embodiment, the diametrically expandable ring 108 is a split ring of spring steel that includes an angled cut 110 extending therethrough which allows the two ends 112, 114 formed by the cut to separate from one another when sufficient pressure is provided on the inner surface of the ring 108, thereby diametrically expanding the ring 108.

Referring to FIGS. 1, 1A, and 6–9, the dial 66 includes a cylindrical opening 116 which includes an inner, cylindrical bearing surface for being received upon, and rotatable about the outer circumferential bearing surface 62 of the male coupling member 22. An annular groove 118 extends into the inner bearing surface 116 of the dial and four axial channels 120, uniformly distributed about the circumference of the dial 66, extend from the leading end surface 122 of the dial and into the annular groove 118. Each of these axial channels 120 is also open to the inner circumferential surface 116 of the dial and have a radial width that is less than the radial depth of the groove 118 such that a radial shoulder 124 is provided on a leading end surface of the groove 118, adjacent to each channel 120.

Received within the radial groove 118 of the dial 66 are a pair of lever-type actuators 126, each of which include an arcuate base 128 and a pair of pins 130 extending perpendicularly from the arcuate base. The lever-type actuators 126 are seated within the radial groove 118 such that the arcuate base 128 resides in the groove 118 or the arc of the arcuate base 128 follows the arc of the respective segment or section of the annular channel 118, and such that each of the pins 130 extend axially outwardly through the channels 120 so as to project axially outwardly from the leading edge surface 122 of the dial 66. The combination of dial 66 and actuators 126 provide a twist-ring subassembly 131.

Referring to FIGS. 1, 1A, 2, 10A and 10B, when the twist-ring subassembly 131 is carried on the generally cylindrical body 26 of the male coupling member 22, the pins 130 extend axially along the flats 64 cut or formed into the cam segment 60 of the body 26, and additionally, are positioned radially between the flats 64 and the inner surface of the diametrically expandable ring 108. The radial width of the axial channels 120 is also longer than the diameter of the pins 130 to provide room for the pins 130 to pivot and flex within the axial channels 120. Referring specifically to FIG. 1A, it is also noted that the substantially flat inner cylindrical surface 102 of the inwardly extending flange 106 on the female coupling member has a diameter such that it is also spaced from the pin 130, when the male and female coupling members are coupled together, which provides room for the pins 130 to pivot and flex.

Referring to FIGS. 10A and 10B when the dial 66 is rotated with respect to the male coupling member, the pins 130 are, in turn, caused to move circumferentially along the flats 64. Because the outer diameter of the cam segment 60 is approximately, or equal to, the inner diameter of the diametrically expandable ring 108, as the pins 130 move circumferentially along the flats 64 towards the outer diameter of the cam segment 60 (as shown by arrow A in FIG. 10B the pins 130 will contact and apply pressure against the inner circumferential surface of the diametrically expandable ring 108, causing the diametrically expandable ring 108 to expand as shown in FIG. 10B. Referring to FIGS. 7 and 9, the outer circumferential surface 132 of the dial 66 is textured to allow a user to easily grip and manually rotate the dial.

Referring to FIGS. 1 and 1A, an O-ring 134 circumnavigates the pins 130 extending out from the leading end surface 122 of the dial 66 and abuts against the leading end surface 122 of the dial 66. When the male and female coupling members are coupled together, the O-ring 134 provides a seal between the leading end surface 122 of the dial 66 carried on the male coupling member 22 and the outwardly angled conical surface 104 of the inwardly extending flange 106 on the female coupling member 24.

In use, to couple the male coupling member 22 to the female coupling member 24, the leading end 86 of the male coupling member is inserted into the receiving end cavity 82 of the female coupling member such that the ramped leading edge 54 of the annular rib 52 on the male coupling member contacts an inner surface of the diametrically expandable ring 108 and causes the diametrically expandable ring 108 to diametrically expand as the ramped section 54 passes through the ring 108. During this expansion, the ring 108 will be maintained in axial position by the annular groove 96 in the female coupling member. Upon the trailing edge 58 of the annular rib 52 passing past the ring 108, the ring will contract again to be maintained in a locking position (as shown best in FIG. 1A) between the trailing edge 58 of the annular rib and the receiving side edge 98 of the annular groove 96 in the female coupling member. If the male and female coupling members were attempted to be pulled apart, the trailing edge 58 of the annular rib 52 on the male coupling member would contact the ring, which will be sandwiched between the trailing edge 58 of the rib 52 on the mail coupling member and the receiving side edge 98 of the annular groove 96 in the female coupling member. Thus, the ring 108 blocks this axial movement of the male coupling member with respect to the female coupling member.

To remove the male coupling member 22 from the female coupling member 24, the dial 66 is rotated such that the pins 130 travel circumferentially along the flats 64 in the cam section 60 of the male coupling member, contact the inner surface of the split ring 108, and cause the split ring 108 to diametrically expand at least until the inner diameter of the split ring is slightly larger than the maximum diameter 56 of the annular rib 52 on the male coupling member. When the split ring is diametrically expanded as described above, the annular rib 52 may traverse rearwardly again past the split ring 108, thus allowing the male coupling member to be removed again from the female coupling member. Preferably, the dial 66 is manually rotated by a user with the user's index finger and thumb on one hand, while using the remainder of the user's fingers to grip the trailing end of male coupling member 22 and pull the mail coupling member 22 from the female coupling member 24, which may be stationary (assuming, of course, that the female coupling member is mounted to a stationary fluid receptacle, source or passage) or which may be gripped by the user's other hand.

As mentioned above, the exemplary embodiment of the hydraulic hose fitting assembly 20 is designed and dimensioned to meet the SAE-J517-Series 100R12 pressure standard. Such a pressure capability is established, at least in part, by providing a locking ring 108 cross-sectional diameter adequate to resist shear forces due to the thrust load of internal pressure in service and by providing the locking ring 108 with an inner diameter that is approximately 1.15 to 1.3 times the size of the nominal outer diameter of the generally cylindrical body 26 of the male coupling member. This nominal outer diameter is approximately the outer diameter of the body 26 near the trailing end 32 of the body; or alternatively, is approximately the outer diameter of the circumferential groove 50. It is noted, however, that the strength of the materials involved is also critical in establishing pressure capabilities, and thus, the above ratios are somewhat dependent upon the physical characteristics of the alloys of construction for the male coupling member, the female coupling member and the locking ring. Higher strength materials would not require as severe a ratio as indicated. In the exemplary embodiment the generally cylindrical body 26 of the male coupling member is machined from ¾ RND-12L14 BAR, the female coupling member is machined from 15/16 HEX-12L14 BAR, and the locking ring 108 is 0.051 carbon spring steel wire (dimensions in inches).

As shown in FIGS. 11–13, an alternate embodiment of the present invention is a hydraulic hose fitting assembly 20N in which the pins 130N are not coupled together by arcuate bases, but are each discrete components respectively extending from axially extending channels 120N, which extend into the leading edge surface 122N of the dial 66N. Because the arcuate bases are no longer utilized with this embodiment, the dial 66N no longer includes a radial groove extending into its circumferential surface for seating the arcuate bases therein. As will be apparent to those of ordinary skill in the art, despite these differences, the operations between the embodiments disclosed herein are essentially the same.

While the exemplary embodiments discussed above pertain to hydraulic hose fitting assemblies, it is within the scope of the invention to utilize the quick connect/disconnect coupling for other purposes, such as, for example, providing a coupling for a pneumatic line, an electrical line or a fiber-optic line.

Following from the above description and summaries, it should be apparent to those of ordinary skill in the art that, while the apparatuses and processes herein described constitute exemplary embodiments of the present invention, it is to be understood that the invention is not limited to these precise apparatuses and processes, and that changes may be made therein without departing from the scope of the invention as defined by the claims. Additionally, it is to be understood that the invention is defined by the claims and it is not intended that any limitations or elements describing the exemplary embodiments herein are to be incorporated into the meaning of the claims unless such limitations or elements are specifically listed in the claims.

What is claimed is:

1. A coupling assembly comprising:

a female coupling member, having a receiving end and a distal end, and including a cavity opening onto the receiving end, the cavity having an annular groove, the annular groove leaving a receiving-side edge and a distal-side edge, a male coupling member, having a leading end and a trailing end, and including an annular rib, the rib having a tapered leading edge, a trailing edge and a maximum diameter between the leading and trailing edges, the male coupling member being sized for insertion into the cavity of the female coupling member so that the trailing edge of the annular rib is able to pass the receiving-side edge of the annular groove in the female coupling member;

a diametrically expandable locking ring carried in the annular groove of the female coupling member, the locking ring having an un-expanded inner diameter that is less than the maximum diameter of the annular rib on the male coupling member, and the locking ring being diametrically expandable to have an inner diameter that is at least slightly larger than the maximum diameter of the annular rib on the male coupling member;

at least one mechanical actuator, including an axially-elongated lever, carried on the male coupling members, on a trailing end side of the annular rib, adjacent to the trailing edge of the annular rib, and operable to project radially outwardly to a radial height at least equal to a radial height of the annular rib at the maximum diameter of the annular rib;

whereby upon insertion of the male coupling member into the cavity of the female coupling member, the tapered leading edge of the annular rib on the male coupling member contacts an inner surface of the locking ring, causing the locking ring to diametrically expand as the locking ring advances towards the trailing edge of the annular rib, and upon passing the trailing edge of the annular rib, the locking ring contracts again and is maintained in a locking position between the trailing edge of the annular rib and the receiving side edge of the annular groove; and whereby the male coupling member may be removed again from the female coupling member by activating the mechanical actuator to project the lever radially outwardly and contact the inner surface of the locking ring causing the locking ring to diametrically expand again so that the annular rib of the male coupling member may pass again by the locking ring.

2. The coupling assembly of claim 1, wherein the actuator lever is operable to splay radially outwardly.

3. The coupling assembly of claim 2, wherein the lever includes:

a carrier mounted for rotation on the male coupling member on a trailing end side of the annular rib and axially spaced from the annular rib;

an outer cam surface of the male coupling member positioned axially between the trailing edge of the annular rib and the carrier, and extending in a circumferential direction from a minimum diameter that is substantially radially recessed with respect to the annular rib to an end diameter that approximates the maximum diameter of the annular rib;

a pin extending axially from a substantially fixed radial point on the carrier, at approximately the minimum diameter, and extending over at least a portion of the outer cam surface;

whereby rotation of the carrier causes the pin to slide in a circumferential direction along the outer cam surface such that the pin splays radially outwardly as the pin approaches the end diameter of the outer cam surface.

4. The coupling assembly of claim 3, wherein the outer cam surface is a substantially flat surface on a plane parallel to a tangent of a rotational axis of the carrier.

5. The coupling assembly of claim 3, wherein the pin is pivotally received within the carrier, allowing the pin to pivot radially with respect to the carrier.

6. The coupling assembly of claim 5, comprising a plurality of the levers, uniformly distributed about a circumference of the male coupling member.

7. The coupling assembly of claim 6, comprising four of the levers, uniformly distributed about the circumference of the male coupling member.

8. The coupling assembly of claim 6, wherein the locking ring is a split ring of resilient material.

9. The coupling assembly of claim 8, wherein the resilient material is spring steel.

10. The coupling assembly of claim 6, wherein the carrier is a manually rotatable dial.

11. The coupling assembly of claim 10, wherein the dial includes a textured circumferential surface to improve gripping by a user.

12. The coupling assembly of claim 6, further comprising an o-ring seal abutting a leading-end side of the carrier and circumscribing the plurality of pins used for the corresponding plurality of levers.

13. The coupling assembly of claim 12, wherein:
the carrier is rotatably mounted upon a cylindrical, trailing-end segment of the male coupling member; and
the coupling assembly further comprises an o-ring seal abutting a trailing-end side of the carrier and circumscribing the trailing-end segment of the male coupling member.

14. The coupling assembly of claim 1, wherein:
the male coupling member includes an axial bore extending into the leading end to provide for the transport of fluids or gasses therein;
the female coupling member includes an axial bore extending into a distal end of the cavity, providing fluid communication with the axial bore extending into the leading end of the male coupling member when the male and female coupling members are coupled together; and
the cavity of the female coupling member includes a inner circumferential surface that substantially matches an outer circumferential surface of the male coupling member, at least from a leading end of the male coupling member to the maximum diameter of the annular rib.

15. The coupling assembly of claim 14, wherein the male coupling member includes at least one circumferential seal carried between the leading end of the male coupling member and the tapered leading edge of the annular rib, for providing a seal between the male coupling member and the female coupling member.

16. The coupling assembly of claim 15, wherein the male coupling member includes a chamferred annular leading edge.

17. The coupling assembly of claim 1, wherein the mechanical actuator includes:
a carrier mounted for rotation on the male coupling member on a trailing end side of the annular rib and axially spaced from the annular rib;
a cylindrical segment of the male coupling member positioned axially between the trailing edge of the annular rib and the carrier, the cylindrical segment having an outer diameter approximately the maximum diameter of the annular rib, the cylindrical segment of the male coupling member including a plurality of substantially flat, outer cam surfaces cut or formed therein and uniformly distributed about a circumference cylindrical segment, each outer cam surface extending tangentially from a minimum diameter that is substantially radially recessed with respect to the annular rib to the outer diameter of the cylindrical segment;
a plurality of pins corresponding to the plurality of outer cam surfaces, each pin extending axially from a respective, substantially fixed radial point on the carrier, approximate the minimum diameter, and extending over at least a portion of the respective outer cam surface, and the pin being radially pivotable or flexible with respect to the radial point on the carrier;
whereby rotation of the carrier causes the pins to slide in a circumferential direction along their respective outer cam surfaces such that the pins splay radially outwardly as they approach the outer diameter cylindrical segment, where such radially outward splaying of the pins applies pressure to the inner surface of the locking ring, causing the locking ring to diametrically expand.

18. The coupling assembly of claim 17, wherein the carrier is a manually rotatable dial.

19. The coupling assembly of claim 1, wherein the trailing edge of the annular rib is substantially perpendicular to a circumferential outer surface of the annular rib at the maximum diameter of the annular rib.

20. The coupling assembly of claim 1, wherein the trailing edge of the annular rib is beveled with respect to a circumferential outer surface of the annular rib at the maximum diameter of the annular rib.

21. The coupling assembly of claim 20, wherein the receiving-side edge of the annular groove in the cavity of the female coupling members beveled at an angle substantially equal to the bevel of the trailing edge of the annular rib.

22. A coupling assembly comprising:
a female coupling member, having a receiving end and a distal end, and including a cavity opening onto the receiving end, the cavity having an annular groove, the annular groove having a receiving-side edge and a distal-side edge;
a male coupling member, having a leading end and a trailing end, and including an annular rib having a tapered leading edge, a trailing edge and a maximum diameter between the leading and trailing edges, the male coupling member being sized for insertion into the cavity of the female coupling member so that the trailing edge of the annular rib is able to pass the receiving-side edge of the annular groove in the female coupling member;
a diametrically expandable locking ring carried in the annular groove of the female coupling, the locking ring having an un-expanded inner diameter that is less than the maximum diameter of the annular rib on the male coupling member, and the locking ring being diametrically expandable to have an inner diameter that is at least slightly larger than the maximum diameter of the annular rib on the male coupling member;
a dial carried for rotation on the male coupling member;
a mechanical actuator including an axially-projecting lever carried on the male coupling member operatively coupled to the dial wherein the axially-projecting lever of the mechanical actuator extends radially outwardly with respect to the male coupling member upon rotation of the dial in a first direction to a radial height at least approximately equal to a radial height of the annular rib at the maximum diameter of the annular rib, and retracts radially inwardly with respect to the male coupling member upon rotation of the dial in an opposite direction;
whereby upon insertion of the male coupling member into the cavity of the female coupling member, the tapered leading edge of the annular rib on the male coupling member contacts an inner surface of the locking ring, causing the locking ring to diametrically expand as the locking ring advances towards the trailing edge of the annular rib, and upon passing the trailing edge of the annular rib, the locking ring contracts again and is maintained in a locking position between the trailing edge of the annular rib and the receiving side edge of the annular groove; and whereby the male coupling member may be removed again from the female coupling member by rotating the dial in the first direction so that the axially-projecting lever of the mechanical actuator projects radially outwardly and contacts the inner surface of the locking ring causing the locking ring to diametrically expand again so that the annular rib of the male coupling member may pass again by the locking ring.

23. The coupling assembly of claim 22, wherein the dial is manually rotatable.

24. The coupling assembly of claim 22, wherein the lever includes a pin operable, upon rotation of the dial in a first direction, to splay radially outwardly.

25. The coupling assembly of claim 24, wherein:
the mechanical actuator includes a cam surface axially positioned between the annular rib and the dial, the cam surface extending in a circumferential direction from a first diameter that is substantially radially recessed with respect to the annular rib to a second diameter that approximates the maximum diameter of the annular rib;
the dial rotates about a central axis of the male coupling member; and
the pin extends axially from a radial point on the dial approximate the first diameter, and extends over at least a portion of the cam surface;
whereby rotation of the dial causes the pin to slide in the circumferential direction along the cam surface from the first diameter towards the second diameter, which in turn causes the pin to splay radially outwardly as the pin approaches the second diameter.

26. The coupling assembly of claim 25, wherein the mechanical actuator includes a plurality of the pins and a corresponding plurality of the cam surfaces, respectively uniformly space about a circumference of the male coupling member.

27. The coupling assembly of claim 26, wherein the mechanical actuator includes an even number of the pins and corresponding cam surfaces.

28. The coupling assembly of claim 27, wherein the mechanical actuator includes at least four of the pins.

29. The coupling assembly of claim 28, wherein:
the dial includes a cylindrical opening extending completely through a central hub of the dial, and a leading end surface;
a cylindrical segment of the male coupling member extends through the cylindrical opening in dial, the cylindrical segment of the male coupling member receiving the dial thereon for rotation;
the pins are arranged in pairs, where each pair of pins includes a connecting segment connecting the pair of pins together at a trailing end of the pair of pins;
the cylindrical opening in the dial includes a cylindrical inner surface; the cylindrical inner surface includes a plurality of arcuate groove sections extending therein;
the number of arcuate groove sections corresponds to the number of pairs of pins;
each arcuate groove section includes a pair of openings on arcuate ends thereof, each opening extending from the respective arcuate end of the arcuate groove section through the leading end surface of the dial; and
each pair of pins being seated in a respective arcuate groove section such that the connecting segment lies in the arcuate groove section and such that one pin extends axially outwardly through a respective one of the pair of openings at the arcuate ends of the arcuate groove section.

30. The coupling assembly of claim 29, wherein the arcuate groove sections are open to one anther, providing an annular groove section.

31. The coupling assembly of claim 26, wherein:
the dial includes a cylindrical opening extending completely through a central hub of the dial, and a leading end surface;
a cylindrical segment of the male coupling member extends through the cylindrical opening in the dial, the cylindrical segment of the male coupling member receiving the dial thereon for rotation; and
the pins are seated within axially aligned cavities extending into the leading end surface of the dial.

32. The coupling assembly of claim 31, wherein the pins are flexible and resilient.

33. The coupling assembly of claim 31, wherein the cavities have a radial dimension larger than a thickness of the pins, thereby allowing the pins to pivot within the cavities.

34. For use with a coupling assembly including (1) a female coupling member, having a receiving end and a distal end, and including a cavity opening onto the receiving end, the cavity having an annular groove, the annular groove having a receiving-side edge and a distal-side edge, (2) a male coupling member, having a leading end and a trailing end, and including an annular rib, the rib having a tapered leading edge, a trailing edge and a maximum diameter between the leading and trailing edges, die male coupling member being sized for insertion into the cavity of the female coupling member so that the trailing edge of the annular rib is able to pass the receiving-side edge of the annular groove in the female coupling member, and (3) a diametrically expandable locking ring carried in the annular groove of the female coupling member, the locking ring having an un-expanded inner diameter that is less than the maximum diameter of tie annular rib on the male coupling member, and the locking ring being diametrically expandable to have an inner diameter that is at least slightly larger than the maximum diameter of the annular rib on the male coupling member, whereupon insertion of the male coupling member into the cavity of the female coupling member, the tapered leading edge of the annular rib on the male coupling member contacts an inner surface of the locking ring, causing the locking ring to diametrically expand as the locking ring advances towards the trailing edge of the annular rib, and upon passing the trailing edge of the annular rib, the locking ring contracts again and is maintained in a locking position between the trailing edge of the annular rib and the receiving side edge of the annular groove, a method for decoupling the male coupling member from the female coupling member comprising the steps of:
providing a mechanical actuator including an axially-projecting lever component radially between an outer surface of the male coupling member and the locking ring;
projecting the axially-projecting lever component of the mechanical actuator radially outwardly against an inner circumferential surface of the locking ring to increase the diameter of the locking ring to a diameter at least slightly larger than the maximum diameter of the annular rib on the male coupling member; and
removing the leading end of the male coupling member from the cavity of the female coupling member.

35. The method of claim 34, herein the projecting step includes the step of radially splaying the lever component radially outwardly.

36. The method of claim 35, wherein the mechanical actuator includes a plurality of the lever components distributed uniformly about a circumference of the locking ring, and the projecting step includes the step of radially splaying the plurality of lever components radially outwardly.

37. The method of claim 36, wherein:

the mechanical actuator includes a carrier mounted for rotation on the male coupling member on a trailing end side of the annular rib and axially spaced from the annular rib, a plurality of outer cam surfaces on the male coupling member, corresponding to the plurality of lever components, the cam surfaces being positioned axially between the trailing edge of the annular rib and the carrier, and extending in a circumferential direction from a first diameter that is substantially radially recessed with respect to the annular rib to a second diameter that approximates the maximum diameter of the annular rib;

the plurality of lever components include a plurality of pins extending axially from a radial point on the carrier, approximate the first diameter, and extending over at least a portion of their respective outer cam surfaces; and the projecting step includes the step of rotating the carrier such that the pins slide in circumferential direction along their respective outer cam surfaces such that the pins splay radially outwardly and the pins approach their respective second diameters of their respective outer cam surfaces.

38. The coupling assembly of claim 1, wherein an outer cam surface is positioned axially between the trailing edge of the annular rib and the mechanical actuator, and extends in a circumferential direction from a minimum diameter that is substantially radially recessed with respect to the annular rib to an end diameter that approximates the maximum diameter of the annular rib, and wherein the lever extends over at least a portion of the outer cam surface; whereby actuation of the mechanical actuator causes the lever to slide in a direction along the outer cam surface such that the lever projects radially outward as the lever approaches the end diameter of the outer cam surface.

39. The coupling assembly of claim 38, wherein the mechanical actuator includes a carrier mounted for rotation on the male coupling member, and the lever extends axially from a substantially fixed radial point on the carrier, and slides in a circumferential direction along the outer cam surface.

40. The coupling assembly as in claim 1, wherein the mechanical actuator includes a carrier mounted for rotation on the male coupling member, and the lever extends axially from a substantially fixed radial point on the carrier, and slides in a circumferential direction along an outer surface of the male coupling members.

41. The coupling assembly of claim 22, wherein an outer cam surface is positioned axially between the trailing edge of the annular rib and the dial, and extends in a circumferential direction from a minimum diameter that is substantially radially recessed with respect to the annular rib to an end diameter that approximates the maximum diameter of the annular rib, and wherein the axially-projecting lever extends over at least a portion of the outer cam surface; whereby actuation of the mechanical actuator causes the lever to slide in a direction along the outer cam surface such that the lever projects radially outward as the lever approaches the end diameter of the outer cam surface.

42. The coupling assembly of claim 41, wherein the mechanical actuator includes a carrier mounted for rotation on the male coupling member, and the lever extends axially from a substantially fixed radial point on the carrier, and slides in a circumferential direction along the outer cam surface.

43. The coupling assembly as in claim 22, wherein the lever extends axially away from a substantially fixed radial point on the dial, and slides in a circumferential direction along an outer surface of the male coupling member.

44. The method of claim 34, wherein an outer cam surface on the male coupling member is positioned axially between the trailing edge of the annular rib and the mechanical actuator, and extends in a circumferential direction from a first diameter that is substantially radially recessed with respect to The annular rib to a second diameter that approximates the maximum diameter of the annular rib, and wherein the axially-projecting lever component extends axially from the mechanical actuator, and extends over at least a portion of the outer cam surface; whereby the projecting step includes the step of projecting the axially-projecting lever component in a direction along the outer cam surface such that the axially-projecting lever component projects radially outward as the axially-projecting lever component approaches the end diameter of the outer cam surface.

45. The method of claim 44, wherein the mechanical actuator includes a carrier mounted for rotation on the male coupling member, and the axially-projecting lever component extends axially from a substantially fixed radial point on the carrier, and the projecting step includes the step of sliding the axially-projecting lever component in a circumferential direction along the outer cam surface.

46. The method of claim 34, wherein the mechanical actuator includes a carrier mounted for rotation on the male coupling member, and the axially-projecting lever component extends axially from a substantially fixed radial point on the carrier, and the projecting step includes the step of sliding the axially-projecting lever component in a circumferential direction along an outer surface of the male coupling member.

* * * * *